United States Patent
Kanala et al.

(10) Patent No.: US 11,905,604 B2
(45) Date of Patent: *Feb. 20, 2024

(54) FORMULATION FOR CORROSION INHIBITION

(71) Applicant: Hindustan Petroleum Corporation Limited, Mumbai (IN)

(72) Inventors: Raghava Krishna Kanala, Bangalore (IN); Naresh Kottari, Bangalore (IN); Venkateswarlu Cheerladinne, Bangalore (IN); Srinivasa Rao Ganagalla, Bangalore (IN); Ramkumar Mangala, Bangalore (IN); Bojja Ramachandrarao, Bangalore (IN); Venkat Chalapathi Rao Peddy, Bangalore (IN); Venkateswarlu Choudary Nettem, Bangalore (IN); Sriganesh Gandham, Bangalore (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 659 days.

This patent is subject to a terminal disclaimer.

(21) Appl. No.: 16/758,607

(22) PCT Filed: Oct. 23, 2018

(86) PCT No.: PCT/IN2018/050686
§ 371 (c)(1),
(2) Date: Apr. 23, 2020

(87) PCT Pub. No.: WO2019/082205
PCT Pub. Date: May 2, 2019

(65) Prior Publication Data
US 2021/0180193 A1    Jun. 17, 2021

(30) Foreign Application Priority Data

Oct. 24, 2017 (IN) .............................. 201721037647

(51) Int. Cl.
*C23F 11/14* (2006.01)

(52) U.S. Cl.
CPC ................................... *C23F 11/143* (2013.01)

(58) Field of Classification Search
CPC ...................................................... C23F 11/143
See application file for complete search history.

(56) References Cited

U.S. PATENT DOCUMENTS

| 5,573,725 A | 11/1996 | Incorvia |
| 2004/0144957 A1 | 7/2004 | Miksic et al. |

(Continued)

FOREIGN PATENT DOCUMENTS

| CN | 106190078 A | 12/2016 | |
| JP | 2003286149 A | * 10/2003 | ............... A61K 8/34 |

OTHER PUBLICATIONS

Niu, English machine translation of CN 106190078 A. (Year: 2016).*

(Continued)

*Primary Examiner* — Peter F Godenschwager
(74) *Attorney, Agent, or Firm* — MARSHALL, GERSTEIN & BORUN LLP (57) ABSTRACT

The present disclosure relates to a corrosion inhibitor formulation comprising: a) at least one quaternary ammonium salt; b) at least one fatty acid methyl ester; c) at least one viscosity reducing agent; and d) at least one solubilizing agent, wherein the at least one quaternary ammonium salt to the at least one fatty acid methyl ester weight ratio is in the range of 1:0.2-1:5.0. The instant disclosure further relates to the process of preparation of the corrosion inhibitor formulation.

19 Claims, 2 Drawing Sheets

(56) References Cited

U.S. PATENT DOCUMENTS

2013/0228095 A1  9/2013  Miles et al.
2015/0011453 A1  1/2015  Bennett et al.
2015/0197683 A1  7/2015  Hategan et al.

OTHER PUBLICATIONS

Hamano et al., English machine translation of JP2003286149A. (Year: 2003).*
International Search Report for Application No. PCT/IN2018/050686, dated Jan. 17, 2019.

* cited by examiner

FORMULATION FOR CORROSION INHIBITION

TECHNICAL FIELD OF THE INVENTION

The present disclosure relates to a corrosion inhibitor composition that prevents or retards corrosion of metal surfaces. In particular, the disclosure relates to a novel corrosion inhibitor composition that prevents internal corrosion of metallurgies such as carbon steel, stainless steel, copper, brass, lead, and zinc involved in fuel storage and transportation through pipelines.

BACKGROUND OF THE INVENTION

Mild steel is a major construction material in various industries including food, petroleum, and power production, chemical, and electrochemical industries. Transportation of fuel through steel pipelines is an essential part of the infrastructure of modern society due to its low-cost, safe mode of long distance transportation of petroleum products. Recently, gaseous products such as liquefied petroleum gases (LPG), natural gases are transported through pipeline under high pressure conditions. However, corrosion has been identified as the major problem in the gas transmission pipeline which leads to the occurrence of leakage of gases, and explosion. In some cases, apart from economic losses, consequence of this failure leads the death of several people through smoke inhalation etc. Corrosion is basically an electrochemical process that involves rearrangement of electrons between metal surface and an aqueous electrolytic solution. In other words, corrosion is destructive disintegration of the metal which is generally afforded by an electrochemical reaction. The process of corrosion could create cracks or holes in aircrafts, automobiles, ships, plumbing, and the like.

Carbon steel is a common construction material in oilfield facilities due to lower cost than corrosion resistant alloys (CRAs), but with a poor corrosion resistance. Controlling internal corrosion is the main problem encountered in flow-lines and pipelines made from carbon steel. The corrosion process is primarily associated with the presence of free water in offshore or onshore production facilities, particularly when it is accompanied by carbon dioxide gas. Internal corrosion is usually associated with significant partial pressures of $CO_2$ and/or $H_2S$ in the line. Additionally, the probability of having appreciable concentration of $O_2$ inside a gas transmission line is apparently quite low, even a small partial pressure of $O_2$ can produce surprisingly high internal corrosion rate in steel pipes. Corrosion inhibitor injection in oilfields is a very common and useful method for pipeline internal corrosion prevention.

A variety of corrosion inhibitors have been used with the gas transmission pipelines to inhibit such corrosion in the metallurgy during storage, pipeline transportation. These inhibitors have been disclosed to include, amongst others, aliphatic and aromatic amines, amine salts of acids, heterocyclic amines, alkenyl succinic acid, triazoles, and the like.

However, because of the diverse conditions that are present inside the industrial equipment, the efficiency of the corrosion inhibitor may vary in the same industrial equipment. An adequate material selection suitable for the operating conditions is essential to find a corrosion resistant material. The effectiveness of a corrosion inhibitor lies in the fact that it must be able to transfer water from the metal surface, interact with anodic and cathodic reaction sites to retard oxidation and reduction corrosion reaction and prevent transportation of water and corrosion active species on metal surface. An additional shortcoming associated with inhibitors used for fuel pipelines, is that they tend to alter the fuel quality, thereby compromising on the standards, such as, BIS and ASTM.

Therefore, there is a need to develop a corrosion inhibitor which is effective against a wide variety of metallurgies, while being effective in a broad temperature and moisture range. It is also important that the corrosion inhibitor, be completely miscible in the hydrocarbon fuel, such as liquefied petroleum gas (LPG). Further, novel corrosion inhibitors must not alter the fuel quality and should not emulsify undesirable amount of water.

SUMMARY OF THE INVENTION

The instant disclosure relates to a corrosion inhibitor formulation comprising: a) at least one quaternary ammonium salt; b) at least one fatty acid methyl ester; c) at least one viscosity reducing agent; and d) at least one solubilizing agent, wherein the at least one quaternary ammonium salt to the at least one fatty acid methyl ester weight ratio is in the range of 1:0.2-1:5.0.

The instant disclosure further relates to a process for the preparation of the corrosion inhibitor formulation comprising: a) at least one quaternary ammonium salt; b) at least one fatty acid methyl ester; c) at least one viscosity reducing agent; and d) at least one solubilizing agent; wherein the at least one quaternary ammonium salt to the at least one fatty acid methyl ester weight ratio is in the range of 1:0.2-1:5.0, said process comprising: a) obtaining the at least one quaternary ammonium salt; b) obtaining the at least one fatty acid methyl ester; c) obtaining the at least one viscosity reducing agent; d) obtaining the at least one solubilizing agent; and e) contacting the at least one quaternary ammonium salt, the at least one fatty acid methyl ester, the at least one solubilizing agent, and the at least one viscosity reducing agent to obtain the corrosion inhibitor formulation.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 25° C. to about 95° C. should be interpreted to include not only the explicitly recited limits of about 25° C. to about 95° C., but also to include sub-ranges, such as 30° C. to 45° C., 75° C. to 90° C., and so forth, as well as individual amounts, including fractional amounts, within the specified ranges, such as 27.2° C., 40.6° C., and 71.3° C., for example.

The term "oil-soluble" is used to refer to the compounds that are essentially "dissolved" or completely dissociated from other compounds or molecules in an oil or hydrocarbon feedstock.

The term "steel' refers to an alloy of iron, mainly comprising varying amounts of carbon and other metals. The corrosion inhibitor formulation as described by the present disclosure is effective on a range of metallurgies including mild steel, carbon steel, stainless steel, among others.

The term "oil" or "fuel" or hydrocarbon" are used in the present disclosure interchangeably to refer to hydrocarbon fuel such as liquefied petroleum gas that are extracted from remote sources and transported via pipelines.

The term "alkyl" refers to a saturated hydrocarbon chain having the specified number of carbon atoms. For example, which are not limited, $C_{1-6}$ alkyl refers to an alkyl group having from 1-6 carbon atoms. Alkyl groups may be straight or branched chained groups. Representative branched alkyl groups have one, two, or three branches. Preferred alkyl groups include, without limitation, methyl, ethyl, n-propyl, isopropyl, butyl, isobutyl.

The term "alkenyl" refers to an unsaturated hydrocarbon chain having the specified number of carbon atoms and at least one double bond. For example, which are not limited, $C_{2-6}$ alkenyl refers to an alkenyl group having from 2-6 carbon atoms. Alkenyl groups may be straight or branched chain groups. Representative branched alkenyl groups have one, two, or three branches. Preferred alkenyl groups include, without limitation, ethenyl, propenyl, but-1-enyl and but-2-enyl.

The term "alkynyl" refers to an unsaturated hydrocarbon chain having the specified number of carbon atoms and at least one double bond. For example, which are not limited, $C_{2-6}$ alkynyl refers to an alkynyl group having from 2-6 carbon atoms. Alkynyl groups may be straight or branched chain groups. Representative branched alkynyl groups have one, two, or three branches. Preferred alkynyl groups include, without limitation, ethynyl, propynyl, but-1-ynyl and but-2-ynyl.

term "aryl" refers to a hydrocarbon functional group derived from an aromatic ring. Aryl groups maybe further substituted with alkyl groups in ortho, meta and/or para positions. Preferred aryl groups include, without limitation, phenyl and napthyl.

The present disclosure is not to be limited in scope by the specific embodiments described herein, which are intended for the purposes of exemplification only. Functionally equivalent products, compositions, and methods are clearly within scope of the disclosure, as described herein.

As described in the background section, there is need for an oil-soluble corrosion inhibitor formulation that is able to efficiently mitigate corrosion without altering the quality of the hydrocarbon fuel or oil. Accordingly, in an embodiment of the present disclosure there is provided a corrosion inhibitor formulation comprising: a) at least one quaternary ammonium salt; b) at least one fatty acid methyl ester; c) at least one viscosity reducing agent; and d) at least one solubilizing agent, wherein the at least one quaternary ammonium salt to the at least one fatty acid methyl ester weight ratio is in the range of 1:0.2-1:5.0. In another embodiment of the present disclosure the at least one quaternary ammonium salt to the at least one fatty acid methyl ester weight ratio is in the range of 1:0.5-1:4.5.

In an embodiment of the present disclosure there is provided a corrosion inhibitor formulation as described herein, wherein the at least one quaternary ammonium salt is a combination of alkyldimethylbenzylammonium chloride and a compound selected from the group consisting of Formula I, Formula I and Formula II,

Formula II wherein, Y is selected from O, —NH, —NR₃;
X is selected from O or S;
A is selected from fluoro, chloro, bromo, iodo, hexafluorophosphate, acetate, OH⁻, HCO₃⁻, CO₃²⁻, R₄COO⁻, R₄SO₄⁻, or R₄SO₃⁻, wherein R₄ is selected from the group consisting of hydrogen, $C_{1-6}$ alkyl, and $C_{5-10}$ aryl, wherein $C_{1-6}$ alkyl, and $C_{5-10}$ aryl are optionally substituted with hydroxyl, nitro, halogen, alkyl, aryl, or —COOR₄;
R₁ is $C_{1-20}$ alkyl, $C_{2-20}$ alkenyl, $C_{2-20}$ alkynyl, and $C_{5-6}$ aryl, wherein, $C_{1-20}$ alkyl, $C_{2-20}$ alkenyl, $C_{2-20}$ alkynyl, and $C_{5-6}$ aryl are optionally substituted with $C_{1-6}$ alkyl, $C_{2-6}$ alkenyl, $C_{2-6}$ alkynyl, and $C_{5-6}$ aryl; and n and m are independently 5 to 10; and
R₂ and R₃ are independently selected from $C_{1-6}$ alkyl.

In an embodiment of the present disclosure there is provided a corrosion inhibitor formulation comprising: a) at least one quaternary ammonium salt; b) at least one fatty acid methyl ester; c) at least one viscosity reducing agent; and d) at least one solubilizing agent, wherein the at least one quaternary ammonium salt to the at least one fatty acid methyl ester weight ratio is in the range of 1:0.2-1:5.0, and wherein the at least one quaternary ammonium salt is a combination of alkyldimethylbenzylammonium chloride and a compound selected from the group consisting of Formula I, Formula I and Formula II,

Formula II wherein, Y is selected from O, —NH, —NR₃;
X is selected from O or S;
A is selected from fluoro, chloro, bromo, iodo, hexafluorophosphate, acetate, OH⁻, HCO³⁻, CO₃²⁻, R₄COO⁻, R₄SO₄⁻, or R₄SO₃⁻, wherein R₄ is selected from the group consisting of hydrogen, $C_{1-6}$ alkyl, and $C_{5-10}$ aryl, wherein $C_{1-6}$ alkyl, and $C_{5-10}$ aryl are optionally substituted with hydroxyl, nitro, halogen, alkyl, aryl, or —COOR₄;
R₁ is $C_{1-20}$ alkyl, $C_{2-20}$ alkenyl, $C_{2-20}$ alkynyl, and $C_{5-6}$ aryl, wherein, $C_{1-20}$ alkyl, $C_{2-20}$ alkenyl, $C_{2-20}$ alkynyl, and $C_{5-6}$ aryl are optionally substituted with $C_{1-6}$ alkyl, $C_{2-6}$ alkenyl, $C_{2-6}$ alkynyl, and $C_{5-6}$ aryl; and n and m are independently 5 to 10; and
R₂ and R₃ are independently selected from $C_{1-6}$ alkyl.

In an embodiment of the present disclosure there is provided a corrosion inhibitor formulation as described herein, wherein the at least one quaternary ammonium salt is a combination of alkyldimethylbenzylammonium chloride and a compound selected from the group consisting of Formula I, Formula I and Formula II,

Formula II wherein, Y is selected from —NH, —NMe;
X is selected from O or S;
A is selected from fluoro, chloro, bromo or iodo;
R₁ is $C_{1-20}$ alkyl, wherein the $C_{1-20}$ alkyl is optionally substituted with $C_{1-6}$ alkyl, $C_{2-6}$ alkenyl, $C_{2-6}$ alkynyl, and $C_{5-6}$ aryl; and n and m are independently 5 to 10; and
R₂ and R₃ are methyl.

In an embodiment of the present disclosure there is provided a corrosion inhibitor formulation as described herein, wherein the at least one quaternary ammonium salt is a combination of alkyldimethylbenzylammonium chloride and a compound selected from the group consisting of Formula I, Formula I and Formula II,

Formula II wherein, Y is selected from —NH, NC₁ alkyl;
X is selected from O;
A is selected from chloro;
R₁ is $C_1$ alkyl, $C_{14}$ alkyl, $C_{16}$ alkyl, $C_{18}$ alkyl, wherein $C_1$ alkyl is substituted with $C_{5-6}$ aryl; and
n is 7 and m is 8; and
R₂ and R₃ are $C_1$ alkyl.

In an embodiment of the present disclosure there is provided a corrosion inhibitor formulation comprising: a) at least one quaternary ammonium salt; b) at least one fatty acid methyl ester; c) at least one viscosity reducing agent; and d) at least one solubilizing agent, wherein the at least one quaternary ammonium salt to the at least one fatty acid methyl ester weight ratio is in the range of 1:0.2-1:5.0, and wherein the at least one quaternary ammonium salt is a combination of alkyldimethylbenzylammonium chloride and a compound selected from the group consisting of Formula I, Formula I and Formula II,

Formula II wherein, Y is selected from —NH, —NC$_1$ alkyl;
X is selected from O;
A is selected from chloro;
R$_1$ is C$_1$ alkyl, C$_{14}$ alkyl, C$_{16}$ alkyl, C$_{18}$ alkyl, wherein C$_1$ alkyl is substituted with C$_{5-6}$ aryl; and
n is 7 and m is 8; and
R$_2$ and R$_3$ are C$_1$ alkyl.

In an embodiment of the present disclosure there is provided a corrosion inhibitor formulation as described herein, wherein the at least one quaternary ammonium salt is a combination of alkyldimethylbenzylammonium chloride and a compound of Formula III Formula III wherein R$_1$ is C$_{14}$H$_{29}$.

In an embodiment of the present disclosure there is provided a corrosion inhibitor formulation as described herein, wherein the at least one quaternary ammonium salt is a combination of alkyldimethylbenzylammonium chloride and a compound of Formula IV Formula IV wherein R$_1$ is C$_{14}$H$_{29}$.

In an embodiment of the present disclosure there is provided a corrosion inhibitor formulation as described herein, wherein the at least one quaternary ammonium salt is a combination of alkyldimethylbenzylammonium chloride and a compound of Formula V Formula V wherein R$_1$ is C$_{14}$H$_{29}$.

In an embodiment of the present disclosure there is provided a corrosion inhibitor formulation as described herein, wherein the at least one quaternary ammonium salt is a combination of alkyldimethylbenzylammonium chloride and a compound of Formula VI Formula VI wherein R$_1$ is C$_{16}$H$_{33}$.

In an embodiment of the present disclosure there is provided a corrosion inhibitor formulation as described herein, wherein the at least one quaternary ammonium salt is a combination of alkyldimethylbenzylammonium chloride and a compound of Formula VII Formula VII wherein R$_1$ is C$_{18}$H$_{37}$.

In an embodiment of the present disclosure there is provided a corrosion inhibitor formulation as described herein, wherein the at least one quaternary ammonium salt is a combination of alkyldimethylbenzylammonium chloride and a compound of Formula VIII Formula VIII wherein R$_1$ is C$_{16}$H$_{33}$.

In an embodiment of the present disclosure there is provided a corrosion inhibitor formulation comprising: a) at least one quaternary ammonium salt is a combination of alkyldimethylbenzylammonium chloride and a compound of Formula III, IV, V, VI, VII, or Viii; b) at least one fatty acid methyl ester; c) at least one viscosity reducing agent; and d) at least one solubilizing agent, wherein the at least one quaternary ammonium salt to the at least one fatty acid methyl ester weight ratio is in the range of 1:0.2-1:5.0.

In an embodiment of the present disclosure there is provided a corrosion inhibitor formulation as described herein, wherein alkyldimethylbenzylammonium chloride to compound of Formula I or Formula II has a weight ratio in the range of 1:0.01 to 1:1. In another embodiment of the present disclosure alkyldimethylbenzylammonium chloride to compound of Formula I or Formula II has a weight ratio in the range of 1:0.05 to 1:0.5.

In an embodiment of the present disclosure there is provided a corrosion inhibitor formulation as described herein, wherein the at least one fatty acid methyl ester is selected from the group consisting of soyabean methyl ester, bio-oil derived fatty acid ester, sunflower oil, castor oil, palmitic acid methyl ester, stearic acid methyl ester, oleic acid methyl ester, linoleic acid methyl ester, rapeseed methyl ester, and combinations thereof. In an embodiment of the present disclosure the at least one fatty acid methyl ester is soyabean methyl ester. In another embodiment of the present disclosure the at least one fatty acid methyl ester is rapeseed methyl ester.

In an embodiment of the present disclosure there is provided a corrosion inhibitor formulation as described herein, wherein the at least one viscosity reducing agent is selected from the group consisting of isopropanol, propanol, ethanol, toluene, benzene, hexane, kerosene, diesel, propargyl alcohol and combinations thereof. In another embodiment of the present disclosure the at least one viscosity regulator is isopropanol.

In an embodiment of the present disclosure there is provided a corrosion inhibitor formulation as described herein, wherein the at least one solubilizing agent is selected from the group consisting of acetic acid, hydroxyacetic acid, tannic acid, 2,6-pyridine dicarboxylic acid, lactic acid, glucono 6-lactone (gluconic acid), 2-puroic acid, thiophene-2-carboxylic acid, 2,3-pyridine dicarboxylic acid, phosphonoacetic acid, thiophene-2-acetic acid, mercaptoacetic acid, propionic acid, butanoic acid, pentanoic acid, benzoic acid, and combinations thereof. In another embodiment of the present disclosure the at least one solubilizing agent is acetic acid.

In an embodiment of the present disclosure there is provided a corrosion inhibitor formulation as described herein, wherein the formulation comprising: a) at least one quaternary ammonium salt having weight percentage in the range of 10-50% with respect to the formulation; b) at least one fatty acid methyl ester having weight percentage in the range of 10-50% with respect to the formulation; c) at least one viscosity reducing agent having weight percentage in the range of 0-5.0% with respect to the formulation; and d) at least one solubilizing agent present in the range of 0.3-3% with respect to the formulation.

In an embodiment of the present disclosure there is provided a corrosion inhibitor formulation comprising: a) at least one quaternary ammonium salt having weight percentage in the range of 10-50% with respect to the formulation; b) at least one fatty acid methyl ester having weight percentage in the range of 10-50% with respect to the formulation; c) at least one viscosity reducing agent having weight percentage in the range of 0-5.0% with respect to the formulation; and d) at least one solubilizing agent present in the range of 0.3-3% with respect to the formulation, wherein the at least one quaternary ammonium salt to the at least one fatty acid methyl ester weight ratio is in the range of 1:0.2-1:5.0.

In an embodiment of the present disclosure there is provided a corrosion inhibitor formulation as described herein, wherein the formulation has alkyldimethylbenzylammonium in the weight range of 0-10% with respect to the formulation. In another embodiment of the present disclosure the formulation has alkyldimethylbenzylammonium in the weight range of 4-6% with respect to the formulation.

In an embodiment of the present disclosure there is provided a corrosion inhibitor formulation as described herein, wherein the formulation comprising: a) at least one quaternary ammonium salt having weight percentage in the range of 15-50% with respect to the formulation; b) at least one fatty acid methyl ester having weight percentage in the range of 15-50% with respect to the formulation; c) at least one viscosity reducing agent having weight percentage in the range of 1.0-5.0% with respect to the formulation; and d) at least one solubilizing agent present in the range of 0.5-2.5 ppm with respect to the formulation.

In an embodiment of the present disclosure there is provided a corrosion inhibitor formulation as described herein, wherein the formulation comprising: a) at least one quaternary ammonium salt having weight percentage in the range of 10-50% with respect to the formulation is a combination of alkyldimethylbenzylammonium chloride and a compound of Formula III, IV, V, VI, VII, or VIII; b) at least one fatty acid methyl ester having weight percentage in the range of 10-50% with respect to the formulation is soyabean methyl ester or rapeseed methyl ester; c) at least one viscosity reducing agent having weight percentage in the range of 0.0-5.0% with respect to the formulation is isopropanol; and d) at least one solubilizing agent present in the range of 0.3-3% with respect to the formulation is acetic acid, and wherein the at least one quaternary ammonium salt to the at least one fatty acid methyl ester weight ratio is in the range of 1:0.2-1:5.0.

In an embodiment of the present disclosure there is provided a corrosion inhibitor formulation as described herein, wherein the dosage of the corrosion inhibitor formulation has a dosage in the range of 3-500 ppm. In another embodiment of the present disclosure the dosage of the corrosion inhibitor formulation is from 20-450 ppm. The term dosage is to be understood as the appropriate amount of formulation usable along with a fuel (such as gas or oil). The range 3-500 ppm is to be taken with respect to the said fuel.

In an embodiment of the present disclosure there is provided a process for the preparation of the corrosion inhibitor formulation comprising: a) at least one quaternary ammonium salt; b) at least one fatty acid methyl ester; c) at least one viscosity reducing agent; and d) at least one solubilizing agent; wherein the at least one quaternary ammonium salt to the at least one fatty acid methyl ester weight ratio is in the range of 1:0.2-1:5.0, said process comprising: a) obtaining the at least one quaternary ammonium salt; b) obtaining the at least one fatty acid methyl ester; c) obtaining the at least one viscosity reducing agent; d) obtaining the at least one solubilizing agent; and e) contacting the at least one quaternary ammonium salt, the at least one fatty acid methyl ester, the at least one solubilizing agent, and the at least one viscosity reducing agent to obtain the corrosion inhibitor formulation.

In an embodiment of the present disclosure there is provided a process as described herein, wherein obtaining the at least one quaternary ammonium salt comprises: (a) contacting (i) at least one fatty alcohol; and (ii) chloroacetyl chloride, in the presence of at least one solvent to obtain a first mixture; (b) contacting the first mixture, and at least one tertiary amine to obtain a compound of Formula I; (c) contacting the compound of Formula I with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) at least one fatty alcohol; and (ii) chloroacetyl chloride, in the presence of at least one solvent to obtain a first mixture; (b) contacting the first mixture, and at least one tertiary amine to obtain a compound of Formula I; (c) contacting the compound of Formula I with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) at least one fatty alcohol; and (ii) chloroacetyl chloride, in the presence of at least one solvent to obtain a first mixture; (b) contacting the first mixture, and at least one tertiary amine to obtain a compound of Formula V; (c) contacting the compound of Formula V with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) at least one fatty alcohol; and (ii) chloroacetyl chloride, in the presence of at least one solvent to obtain a first mixture; (b) contacting the first mixture, and at least one tertiary amine to obtain a compound of Formula VI; (c) contacting the compound of Formula VI with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) at least one fatty alcohol; and (ii) chloroacetyl chloride, in the presence of at least one solvent to obtain a first mixture; (b) contacting the first mixture, and at least one tertiary amine to obtain a compound of Formula VII; (c) contacting the compound of Formula VII with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) at least one amine selected from aniline or N-alkyl aniline; and (ii) chloroacetyl chloride, in the presence of at least one solvent to obtain a first mixture; and (b) contacting the first mixture, and at least one tertiary amine to obtain a compound of Formula II; (c) contacting the compound of Formula II with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) aniline; and (ii) chloroacetyl chloride, in the presence of at least one solvent to obtain a first mixture; and (b) contacting the first mixture, and at least one tertiary amine to obtain a compound of Formula III; (c) contacting the compound of Formula III with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) N-methyl aniline; and (ii) chloroacetyl chloride, in the presence of at least one solvent to obtain a first mixture; and (b) contacting the first mixture, and at least one tertiary amine to obtain a compound of Formula IV; (c) contacting the compound of Formula IV with alkyldimethylbenzylammonium chloride to obtain the at least one quaternary ammonium salt.

In an embodiment of the present disclosure there is provided a process as described herein, wherein obtaining the at least one quaternary ammonium salt comprises: (a) contacting (i) N-methyl aniline; and (ii) chloroacetyl chloride, in the presence of at least one solvent to obtain a first mixture; and (b) contacting the first mixture, and at least one tertiary amine to obtain a compound of Formula VIII; (c) contacting the compound of Formula VIII with alkyldimethylbenzylammonium chloride to obtain the at least one quaternary ammonium salt.

In an embodiment of the present disclosure there is provided a process as described herein, wherein the at least one fatty alcohol is selected from $C_{6-20}$ alcohols. In another embodiment of the present disclosure the at least one fatty alcohol is selected from a group consisting of oleyl alcohol, linoleic alcohol, decene-1-ol, dodecene-2-ol, myristyl alcohol, cetyl alcohol, stearyl alcohol, palmitic alcohol, and combinations thereof. In yet another embodiment of the present disclosure the at least one fatty alcohol is oleyl alcohol. In another alternate embodiment of the present disclosure the at least one fatty alcohol is steric alcohol. In another embodiment of the present disclosure the at least one fatty alcohol is palmitic alcohol.

In an embodiment of the present disclosure the at least one tertiary amine is selected from the group consisting of triethylamine, triethanol amine, N,N-dimethyl benzyl amine, N,N-Dimethyl octadecyl amine, N,N-dimethyl tetradecyl amine, N,N-dimethyl octadecyl amine, N,N-diethyl benzyl amine, and combinations thereof. In another embodiment of the present disclosure the at least one tertiary amine is N, N-dimethyl benzyl amine. In yet another embodiment of the present disclosure the at least one tertiary amine is N, N-dimethyl octadecyl amine. In another embodiment of the present disclosure the at least one tertiary amine is N, N-dimethyl tetradecyl amine.

In an embodiment of the present disclosure there is provided a process as described herein, wherein the at least one fatty alcohol selected from the group consisting of oleyl alcohol, stearic alcohol, palmitic alcohol, and combinations thereof; and the at least one tertiary amine is selected from the group consisting of N, N-dimethyl benzyl amine, N, N-dimethyl octadecyl amine, N, N-dimethyl tetradecyl amine, N, N-dimethyl hexadecyl amine, and combinations thereof. In another embodiment of the present disclosure the at least one fatty alcohol is oleyl alcohol and the at least one tertiary amine is N, N-dimethyl benzyl amine. In another embodiment of the present disclosure the at least one fatty alcohol is stearic alcohol and the at least one tertiary amine is N, N-dimethyl octadecyl amine. In another embodiment of the present disclosure the at least one fatty alcohol is palmitic alcohol and the at least one tertiary amine is N, N-dimethyl hexadecyl amine.

In an embodiment of the present disclosure there is provided a process as described herein, wherein the at least one fatty alcohol to the chloroacetyl chloride is in the weight ratio in the range of 1:1 to 2:1.

In an embodiment of the present disclosure there is provided a process as described herein, wherein the at least one solvent is selected from the group consisting of dichloromethane, chloroform, dimethylformamide, tetrahydrofuran, dimethysulfoxide, and combinations thereof. In another embodiment of the present disclosure the at least one solvent is dichloromethane. In yet another embodiment of the present disclosure the solvent is chloroform.

In an embodiment of the present disclosure there is provided a process as described herein, wherein the formulation has alkyldimethylbenzylammonium in the weight range of 0-10% with respect to the formulation. In another embodiment of the present disclosure the formulation has alkyldimethylbenzylammonium in the weight range of 4-6% with respect to the formulation.

In an embodiment of the present disclosure there is provided a process as described herein, wherein (a) contacting (i) at least one fatty alcohol; and (ii) chloroacetyl chloride, in the presence of at least one solvent to obtain a first mixture is carried out at a temperature in the range of 0-5° C. for a period of 1-6 hours; and (b) contacting the first mixture, and at least one tertiary amine to obtain the compound of Formula I out at a temperature in the range of 25-95° C. for a period of 6-24 hours; (c) contacting the compound of Formula I with alkyldimethylbenzylammonium chloride to obtain to obtain the at least one quaternary ammonium salt is carried out at a temperature in the range of 25-95° C. for a period of 6-24 hours. In another embodiment of the present disclosure (a) contacting (i) at least one fatty alcohol; and (ii) chloroacetyl chloride, in the presence of at least one solvent to obtain a first mixture is carried out at a temperature in the range of 0.5-4.5° C. for a period of 1.5-5.5 hours; and (b) contacting the first mixture, and at least one tertiary amine to obtain the compound of Formula I out at a temperature in the range of 28-92° C. for a period of 6.5-23.5 hours; (c) contacting the compound of Formula I with alkyldimethylbenzylammonium chloride to obtain to obtain the at least one quaternary ammonium salt is carried out at a temperature in the range of 28-92° C. for a period of 6.5-23.5 hours.

In an embodiment of the present disclosure there is provided a process as described herein, wherein (a) contacting (i) at least one amine selected from aniline or N-alkyl aniline; and (ii) chloroacetyl chloride, in the presence of at least one solvent to obtain a first mixture is carried out at a temperature in the range of 0-5° C. for a period of 1-6 hours; and (b) contacting the first mixture, and at least one tertiary amine to obtain the compound of Formula II; (c) contacting the compound of Formula II with alkyldimethylbenzylammonium chloride to obtain at least one quaternary ammonium salt is carried out at a temperature in the range of 25-95° C. for a period of 6-24 hours. In another embodiment of the present disclosure (a) contacting (i) at least one amine selected from aniline or N-alkyl aniline; and (ii) chloroacetyl chloride, in the presence of at least one solvent to obtain a first mixture is carried out at a temperature in the range of 0.5-4.5° C. for a period of 1.5-5.5 hours; and (b) contacting the first mixture, and at least one tertiary amine to obtain the compound of Formula II; (c) contacting the compound of Formula II with alkyldimethylbenzylammonium chloride to obtain at least one quaternary ammonium salt is carried out at a temperature in the range of 28-92° C. for a period of 6.5-23.5 hours.

In an embodiment of the present disclosure there is provided a corrosion inhibitor formulation as described herein, wherein the formulation is useful for inhibiting corrosion and removing hydrocarbonaceous deposits in oil and gas applications.

In an embodiment of the present disclosure there is provided a corrosion inhibitor formulation as described herein, wherein the corrosion inhibitor formulation is suitable for corrosion prevention of metallurgies comprising carbon steel, copper, brass, lead and zinc involved in fuel storage tanks, vehicles fuel tanks during transportation, and fuel distribution systems. In another embodiment of the present disclosure the corrosion inhibition formulation is suitable for corrosion prevention of carbon steel.

In an embodiment of the present disclosure there is provided a corrosion inhibitor formulation as described herein, wherein the corrosion inhibitor formulation has a corrosion current density of less than 0.4 and inhibition efficiency of 94 to 96% for metallurgies comprising carbon steel, copper and brass.

In an embodiment of the present disclosure there is provided a corrosion inhibitor formulation as described herein, wherein the corrosion inhibitor formulation is suitable for prevention of corrosion of metallurgies selected from the group consisting of carbon steel, copper, mild steel, stainless steel, chromium steel alloys and brass at operating temperature in the range of 0-100° C. containing hydrocarbon fuel composition. In another embodiment of the present disclosure the hydrocarbon fuel composition is liquified petroleum gas (LPG).

In an embodiment of the present disclosure there is provided a corrosion inhibitor formulation as described herein, wherein the corrosion inhibitor formulation is suitable for prevention of corrosion at operating temperature in the range of 10-70° C. and a moisture range of 0-5% with respect to the hydrocarbon fuel composition.

In an embodiment of the present disclosure there is provided a process of protecting a metal surface against corrosion comprising: contacting a downhole metal surface with the corrosion inhibitor formulation, said formulation comprising: a) at least one quaternary ammonium salt; b) at least one fatty acid methyl ester; c) at least one viscosity reducing agent; and d) at least one solubilizing agent; wherein the at least one quaternary ammonium salt to the at least one fatty acid methyl ester weight ratio is in the range of 1:0.2-1:5.0.

In an embodiment of the present disclosure there is provided a corrosion inhibitor formulation as described herein, wherein the formulation is effective in presence of a variety of hydrocarbon fuels including liquefied petroleum gas (LPG), diesel, petroleum, and mixtures thereof.

In an embodiment of the present disclosure there is provided a corrosion inhibitor formulation as described herein, wherein the formulation does not have any adverse effect on fuel quality. In another embodiment of the present disclosure the formulation does not change or alter any of the properties of fuel, wherein the properties are as per ASTM and BIS specifications.

EXAMPLES

The following examples are given by way of illustration of the present invention and should not be construed to limit the scope of the present disclosure. It is to be understood that both the foregoing general description and the following detailed description are exemplary and explanatory only and are intended to provide further explanation of the claimed subject matter.

It is understood that steel surface bears a positive charge in $H_2CO_3$ solution ($CO_2$ environment), so it is difficult for the quaternary cations to approach the positively charged carbon steel surface due to the electrostatic repulsion. Since chloride ions have a smaller degree of hydration, have stronger tendency to adsorb than $CO_3^{2-}$ ions, create excess negative charges in the vicinity of the interface and eventually favor more adsorption of the cations. Thus, $Cl^-$ plays the role of a bridge joining the positively charged cations and the negatively charged metal surface. Besides, when quaternary cations are adsorbed on steel surface, a coordinate bond may be formed by partial transference of p electrons from benzene ring to vacant d orbits of Fe.

Example 1 (Preparation of First Mixture)

To a stirred solution of oleyl alcohol (37.2 mmol) and pyridine (2.8 mL) in anhydrous chloroform (20 mL) at 0° C., chloroacetyl chloride (44.7 mmol) was dropwise. The solution was stirred for 1 hr and allowed to stir at room temperature for another 4 hours. Afterwards, the reaction mixture was neutralized with sodium bicarbonate solution (20 mL) followed by washing with water (30 mL) and brine solution (15 mL). The organic layer was dried over anhydrous sodium sulphate and the product was purified by column chromatography with DCM and pet-ether to furnish the corresponding oily compound. The yield of the product was found to be 95%.

Example 2

To a stirred solution of 1 gm of this product, 0.18 gm of N, N-dimethyl benzyl amine was added and stirred for 6-24 hours. The product was obtained as white solid.

Example 3

The present Example 3 was prepared in a manner similar to the one described above in Example 1 and 2, wherein the compatible solvents for the process were dichloromethane, chloroform or dimethylformamide. Briefly, to a stirred solution of chloroacetyl chloride (1 eq), N-Methyl aniline (1.1 eq) was added dropwise at 10° C. to room temperature and stirred for 2 hours at room temperature (~25° C.). To the above solution, $C_{16}H_{33}NMe_2$ was added at room temperature and refluxed at 90° C. for 4 hours to obtain the ammonium salt as a yellow colour compound. The LC-MS (m/z at 370) confirmed the formation of below compound Formula VIII wherein $R_4$ is $C_{16}H_{33}$.

The first mixture obtained by Examples 1-3 were mixed with appropriate amounts of alkyldimethylbenzylammonium chloride (at least one quaternary ammonium salt) and other critical ingredients as mentioned below to obtain the corrosion inhibitor formulation.

Example 4

Preparation of the Corrosion Inhibitor Formulation

A corrosion inhibitor formulation was formed from the corrosion inhibitor as obtained in Example-2. 50% (w/w) of the corrosion inhibitor was mixed into soya methyl ester, 5% (w/w) of the commercial benzalkonium chloride (or alkyldimethylbenzylammonium chloride), 2.5% acetic acid and 0.5% of isopropanol to yield corrosion inhibitor formulation A.

Example 5

A corrosion inhibitor formulation was formed from the corrosion inhibitor as obtained in Example-2. 50% (w/w) of the corrosion inhibitor was mixed into rapeseed methyl ester, 5% (w/w) of the commercial benzalkonium chloride, 2.5% acetic acid and 0.5% of isopropanol to yield corrosion inhibitor formulation B.

Example 6

To a stirred solution of 1 gm of the product as obtained from Example-1, 0.93 gm. of N,N-dimethyl octadecyl amine was added and stirred for 6-24 hours. The product was obtained as white solid.

Example 7

A corrosion inhibitor formulation was formed from the product as obtained in Example-6. 50% (w/w) of the corrosion inhibitor was mixed into soya methyl ester, 5% of the commercial benzalkonium chloride, 2.5% acetic acid and 0.5% of isopropanol to yield corrosion inhibitor formulation C.

Example 8

To a stirred solution of 1 gm of the product as obtained from Example-1, 0.93 gm of N,N-dimethyl hexadecyl amine was added and stirred for 6-24 hours. The product was obtained as white solid.

Example 9

A corrosion inhibitor formulation was formed from the corrosion inhibitor as obtained in Example-8. 50% (w/w) of the corrosion inhibitor was mixed into soya methyl ester, 5% (w/w) of the commercial benzalkonium chloride, 2.5% acetic acid and. 0.5% of isopropanol yield corrosion inhibitor formulation D.

Example 10

To a stirred solution of 1 gm of the product as obtained from Example-1, 0.93 gm of N,N-dimethyl tetradecyl amine was added and stirred for 6-24 hours. The product was obtained as white solid.

Example 11

A corrosion inhibitor formulation was formed from the product as obtained in Example-10. 50% (w/w) of the corrosion inhibitor was mixed into soya methyl ester, 5% (w/w) of the commercial benzalkonium chloride and 2.5% acetic acid was further added. Finally, 0.5% of isopropanol was added as viscosity reducing agent to yield corrosion inhibitor formulation E.

Example 12

The corrosion inhibitor formulation was formed from the corrosion inhibitor as obtained in Example 3. 5% (w/w) of compound of Example 3; 45% of commercial benzalkonium chloride was mixed into soya methyl ester, along with the 2.5% acetic acid and, 0.5% of isopropanol.

Example 13

Numerous formulations have been discussed in the Examples 1-12. Corrosion inhibition formulations used for carrying out testing have been listed below in Table 1.

| Code | Compound | Soya fatty acid methyl ester (FAME) | Isopropyl alcohol (IPA) | Acetic acid (AcOH) |
| --- | --- | --- | --- | --- |
| VR C4 | Benzalkonium chloride (50%) | 47% | 0.5% | 2.5% |
| VR C10 | Example 7: 50% | 47% | 0.5% | 2.5% |
| VR C11 | Example 11: 50% | 47% | 0.5% | 2.5% |
| VR C12 | Example 5: 50% | 47% | 0.5% | 2.5% |

Example 14

Weight Loss Studies

In this study, 5 L of synthetic brine and LVT 200 oil (commercially procured base oil) mixture (70:30) was purged with nitrogen (1 hours), followed by carbon dioxide (2 hours) to obtain the concentration of oxygen to less than 25 ppb. Then, pre-cleaned and pre-weighed mild steel specimens were suspended in the solution and stirred at a rate of 700 RPM with and without various concentrations of inhibitor for a period of 24 hours. After that, the mild steel specimens were taken out, washed with distilled water, isopropanol, dried with air drier and weighed accurately. The weight loss studies were made in triplicate and the loss of weight was calculated by taking an average (mean) of these values. The standard deviation in the observed weight loss values was calculated and reported. The corrosion rate (CR) is calculated by the following equation (1)—

$$CR = W/St \qquad (1)$$

where W is the average (mean value) weight loss of three mild steel specimens, S is the total area of mild steel specimen and t is the immersion time.

From the calculated CR value, the inhibition efficiency (IE %) was calculated according to the following equation (2)—

$$IE(\%) = (Wo - Wi)/(Wo \times 100)$$

where Wo and Wi are the corrosion rate in the absence and presence of various concentrations of corrosion inhibitor, respectively.

Figure 1:
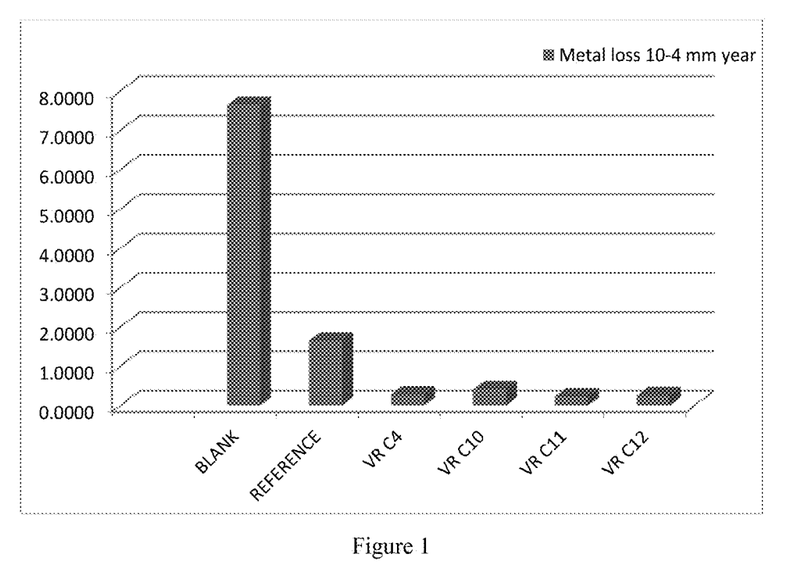
FIG. 1 illustrates a bar graph depicting the metal loss per year of samples tested with various corrosion inhibition formulations, in accordance with an implementation of the present subject matter.
Figure 2:
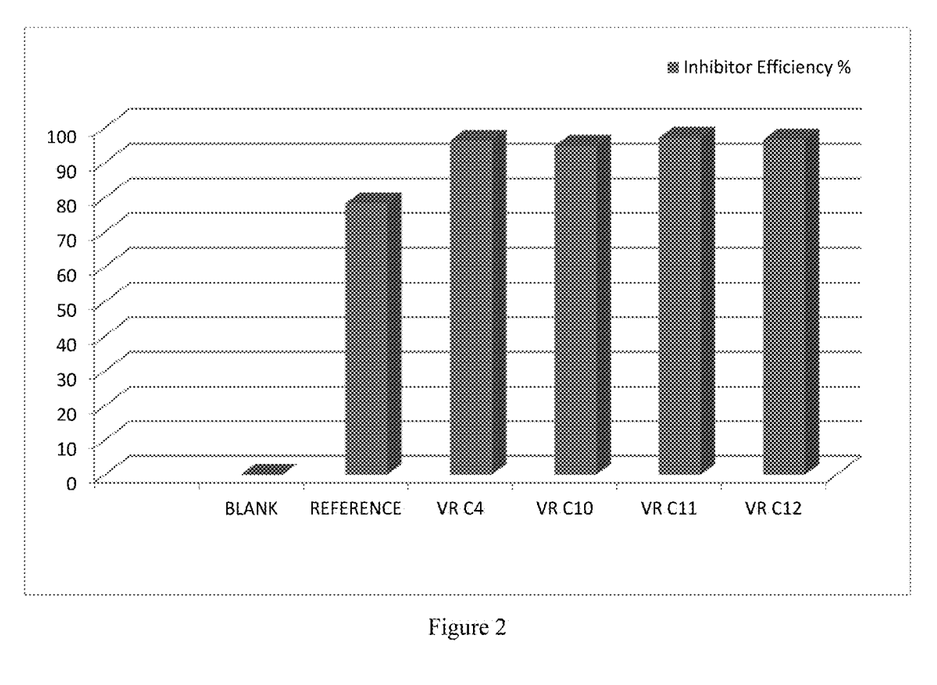
FIG. 2 illustrates a bar graph depicting the inhibitor efficiency of samples tested with various corrosion inhibition formulations, in accordance with an implementation of the present subject matter.
Figure 3:
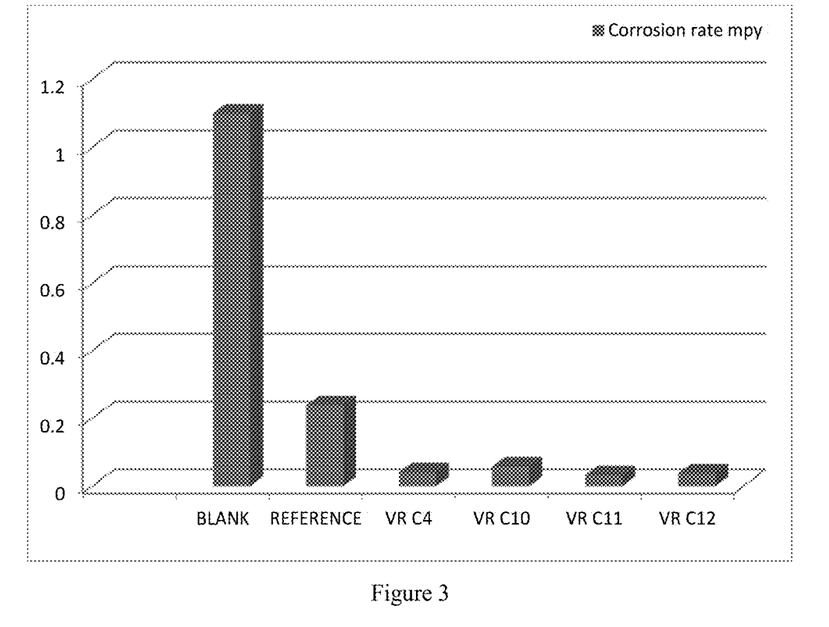
FIG. 3 illustrates a bar graph depicting the corrosion rate of samples tested with various corrosion inhibition formulations, in accordance with an implementation of the present subject matter.

The test results are depicted in FIG. 1-3 are summarized below in Table 2 below—

| S. NO | RUN | Metal loss ($\times 10^{-4}$ mm/year) | Corrosion rate (mm/year or mpy) | Inhibition Efficiency (%) |
|---|---|---|---|---|
| 1 | BLANK | 7.6454 | 1.0997 | 0 |
| 2 | REFERENCE | 1.6510 | 0.2388 | 78.29 |
| 3 | VR C4 | 0.2794 | 0.0411 | 96.27 |
| 4 | VR C10 | 0.4064 | 0.0574 | 94.78 |
| 5 | VR C11 | 0.2286 | 0.0319 | 97.1 |
| 6 | VR C12 | 0.254 | 0.0376 | 96.59 |

As can be observed from Table 2, all formulations performed admirably with an inhibition efficiency of at least 94%. In the case of formulations VR C11 and VR C12 metal loss was also found to be reduced by a factor of almost 8 when compared with the reference. Formulations VR C11 and VR C12 were found to perform best with high efficiency and low corrosion rates.

Example 13

Linear Polarization Resistance (LPR) Test Method

The LPR test method measured the corrosion rate in real time electrochemically. Metal electrodes, typically well-characterized carbon steel, were used to determine the corrosion rate of the corrosive fluid. The reference and auxiliary electrodes were sometimes made of the same material and sometimes from different materials. The test vessel contained the electrodes, sparge and gas outlet tubes, thermometer or thermocouple, and stirrer. The test vessel was heated by a heating mantle, constant temperature bath, hot plate, or lamp. The fluids were stirred by a stir bar or overhead stirrer. The test fluid was a conductive liquid such as brine or a brine/oil mixture. To simulate field conditions and maintain the corrosiveness of the fluid, the test vessel was sparged with $CO_2$, $H_2S$, or gas mixtures. The fluids were added to the corrosion test vessels. These vessels were usually glass flasks equipped so that the fluids could be agitated and heated. The fluids were heated to the test temperature while being sparged with the corrosive gases. The fluids were under continuous agitation. Field conditions were considered in the determination of the degree of agitation. A suitable amount of corrosion inhibitor was added and the corrosion rate determined. This step was repeated for increasing inhibitor dosages. Linear polarization was performed by (1) controlling the potential and measuring the current or (2) controlling the current and measuring the potential. The maximum potential excursion was typically 25 mV. LPR data were analysed by fitting multiple data points or a simple analysis using a single data point.

When the change in potential was plotted against the current change, a straight line was obtained. The slope of this line is the polarization resistance and is inversely proportional to the corrosion rate. The results for the LPR data are summarized below in Table 3.

TABLE 3

| Experiment Tafel Plot | Blank | VRC4 | VRC10 | VRC11 | VRC12 |
|---|---|---|---|---|---|
| (i) $E_{Corr}$ (mV) | −463.5 | −585.2 | −598.3 | −601.9 | −557.3 |
| (ii) $I_{Corr}$ (μA) | 420.9 | 160 | 169.4 | 147 | 168.8 |
| (iii) Corrosion Rate (mpy) | 64.12 | 24.37 | 25.80 | 22.39 | 25.71 |
| (iv) Beta A (mV vs Ref/Decade) | 72.34 | 109.8 | 74.74 | 80.11 | 67.81 |
| (v) Beta C (mV vs Ref/Decade) | 140.9 | 166.4 | 105.6 | 95.88 | 86.43 |
| (vi) Polarization resistance, Rp (ohms) | 49.77 | 179.5 | 112.2 | 128.9 | 97.75 |

Figure 4:
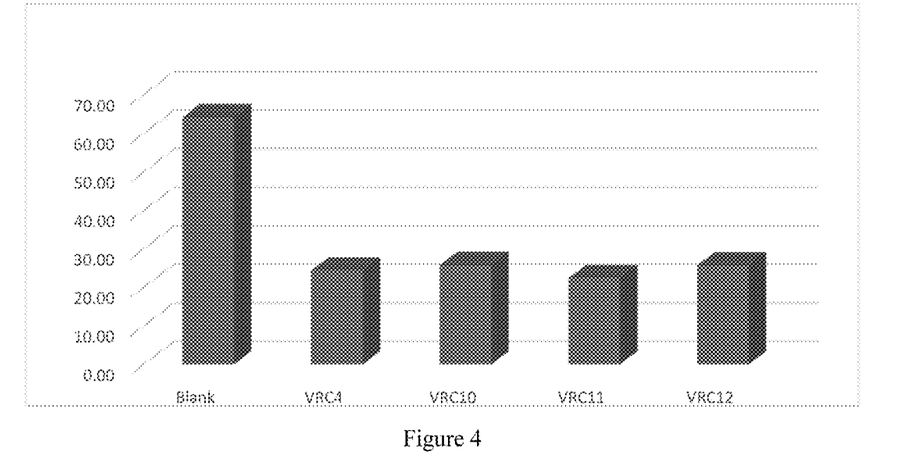
FIG. 4 illustrates a bar graph depicting the corrosion rate of samples tested with various corrosion inhibition formulations in presence of 1% NaCl and pH: 5.6-5.7, in accordance with an implementation of the present subject matter.

The tests results, as depicted in FIG. 4, were found to be within the limit of standard fuel blend composition (summarized above in Table 3). The low corrosion ($I_{Corr}$) currents observed for VR C4 and VR C12 are indicative of the efficiency of the formulation. Hence, it is noted that the corrosion inhibitor formulation was found to be effective in protecting mild steel (Example 14). From examples 1-13 it is further noted that the formulation is prepared by the process provided and wherein the various ingredients are used in appropriate ratios. As an example, it is to be noted that at least one quaternary ammonium salt to the at least one fatty acid methyl ester weight ratio is to be in the range of 1:0.2-1:5.0. The formulation was found to provide acceptable activity when the ingredients were employed within said range.

Advantages Gained in the Example Illustrative Process in this Subject Matter:

The quaternary ammonium compounds synthesized in the present disclosure are used for preparing the corrosion inhibitor formulations. The valuation of these formulations was performed by rotating cage experiment (weight loss technique). The results indicated that the formulations show excellent corrosion inhibition properties based on their corrosion inhibition efficiency compared to the commercial product. The present disclosure describes a hydrocarbon (such as LPG) fuel composition that prevents corrosion of metallurgies at operating temperatures of 0-100° C. and is effective in a moisture content ranging from 0-5% in the LPG fuel (hydrocarbon fuel) composition.

We claim:

1. A corrosion inhibitor formulation comprising:
   a) at least one quaternary ammonium salt in a range of 10-50 weight % with respect to the formulation;
   b) at least one fatty acid methyl ester in a range of 10-50 weight % with respect to the formulation;
   c) at least one viscosity reducing agent in a range of 0-5.0 weight % with respect to the formulation; and
   d) at least one solubilizing agent in a range of 0.3-3 weight % with respect to the formulation, wherein the at least one quaternary ammonium salt to the at least one fatty acid methyl ester weight ratio is in a range of 1:0.2-1:5.0.

2. The corrosion inhibitor formulation as claimed in claim 1, wherein the at least one quaternary ammonium salt is a combination of alkyldimethylbenzylammonium chloride and a compound selected from the group consisting of Formula I, Formula I and Formula II, Formula II wherein Y is selected from O, —NH, or —NR₃;
X is selected from O or S;
A is selected from fluoro, chloro, bromo, iodo, hexafluorophosphate, $OH^-$, $HCO_3^-$, $CO_3^{2-}$, $R_4COO^-$, $R_4SO_4^-$, or $R_4SO_3^-$, wherein $R_4$ is selected from the group consisting of hydrogen, $C_{1-6}$ alkyl, and $C_{5-10}$ aryl, wherein $C_{1-6}$ alkyl, and $C_{5-10}$ aryl are optionally substituted with hydroxyl, nitro, halogen, alkyl, aryl, or —COOR₄;
$R_1$ is $C_{1-20}$ alkyl, $C_{2-20}$ alkenyl, $C_{2-20}$ alkynyl, and $C_{5-6}$ aryl, wherein $C_{1-20}$ alkyl, $C_{2-20}$ alkenyl, $C_{2-20}$ alkynyl, and $C_{5-6}$ aryl are optionally substituted with $C_{1-6}$ alkyl, $C_{2-6}$ alkenyl, $C_{2-6}$ alkynyl, and $C_{5-6}$ aryl; and n and m are independently 5 to 10; and
$R_2$ and $R_3$ are independently $C_{1-6}$ alkyl.

3. The corrosion inhibitor formulation as claimed in claim 2, wherein alkyldimethylbenzylammonium chloride to the compound of Formula I or Formula II weight ratio is in a range of 1:0.01 to 1:1.

4. The corrosion inhibitor formulation as claimed in claim 1, wherein the at least one quaternary ammonium salt is a combination of alkyldimethylbenzylammonium chloride and a compound selected from the group consisting of Formula I Formula I and Formula II, Formula II wherein Y is selected from —NH, —NC₁ alkyl;
X is selected from O or S;
A is selected from fluoro, chloro, bromo or iodo;
$R_1$ is $C_{1-20}$ alkyl, wherein the $C_{1-20}$ alkyl is optionally substituted with $C_{1-6}$ alkyl, $C_{2-6}$ alkenyl, $C_{2-6}$ alkynyl, and $C_{5-6}$ aryl; and n and m are independently 5 to 10; and
$R_2$ and $R_3$ independently are $C_1$ alkyl.

5. The corrosion inhibitor formulation as claimed in claim 1, wherein the at least one fatty acid methyl ester is selected from a group consisting of soyabean methyl ester, bio-oil derived fatty acid ester, sunflower oil, castor oil, palmitic acid methyl ester, stearic acid methyl ester, oleic acid methyl ester, linoleic acid methyl ester, rapeseed methyl ester, and combinations thereof.

6. The corrosion inhibitor formulation as claimed in claim 1, wherein the at least one viscosity reducing agent is selected from a group consisting of isopropanol, propanol, ethanol, toluene, benzene, hexane, kerosene, diesel, propargyl alcohol, and combinations thereof.

7. The corrosion inhibitor formulation as claimed in claim 1, wherein the at least one solubilizing agent is selected from a group consisting of acetic acid, hydroxyacetic acid, tannic acid, 2,6-pyridine dicarboxylic acid, lactic acid, glucono 6-lactone (gluconic acid), 2-puroic acid, thiophene-2-carboxylic acid, 2,3-pyridine dicarboxylic acid, phosphonoacetic acid, thiophene-2-acetic acid, mercaptoacetic acid, propionic acid, butanoic acid, pentanoic acid, benzoic acid, and combinations thereof.

8. The corrosion inhibitor formulation as claimed in claim 1, wherein corrosion inhibitor formulation has a dosage in a range of 3-500 ppm.

9. The corrosion inhibitor formulation as claimed in claim 1, for inhibiting corrosion and removing hydrocarbonaceous deposits in oil and gas applications.

10. The corrosion inhibitor formulation as claimed in claim 9, wherein the corrosion inhibitor formulation is suitable for corrosion prevention of metallurgies comprising carbon steel, copper, brass, lead and zinc involved in fuel storage tanks, vehicles fuel tanks during transportation, and fuel distribution systems.

11. The corrosion inhibitor formulation as claimed in claim 9, wherein the corrosion inhibitor formulation has a corrosion current density of less than 0.4 and an inhibition efficiency of 94 to 96% for metallurgies comprising carbon steel, copper and brass.

12. The corrosion inhibitor formulation as claimed in claim 9, wherein the corrosion inhibitor formulation is suitable for prevention of corrosion of metallurgies selected from a group consisting of carbon steel, copper, mild steel, stainless steel, chromium steel alloys and brass at an operating temperature in a range of 0-100° C. containing a hydrocarbon fuel composition.

13. The corrosion inhibitor formulation as claimed in claim 12, wherein the corrosion inhibitor formulation is suitable for prevention of corrosion at an operating temperature in a range of 10-70° C. and a moisture range of 0-5% with respect to the hydrocarbon fuel composition.

14. A process for the preparation of the corrosion inhibitor formulation as claimed in claim 1, the process comprising:
   a) obtaining the at least one quaternary ammonium salt in a range of 10-50 weight % with respect to the formulation;
   b) obtaining the at least one fatty acid methyl ester in a range of 10-50 weight % with respect to the formulation;
   c) obtaining the at least one viscosity reducing agent in a range of 0-5.0 weight % with respect to the formulation;
   d) obtaining the at least one solubilizing agent in a range of 0.3-3 weight % with respect to the formulation; and
   e) contacting the at least one quaternary ammonium salt, the at least one fatty acid methyl ester, the at least one solubilizing agent, and the at least one viscosity reducing agent to obtain the corrosion inhibitor formulation.

15. The process for preparation of the corrosion inhibitor formulation as claimed in claim 14, wherein obtaining the at least one quaternary ammonium salt comprises: (a) contacting (i) at least one fatty alcohol; and (ii) chloroacetyl chloride, in the presence of at least one solvent at a temperature in a range of 0-5° C. for a period of 1-6 hours to obtain a first mixture; (b) contacting the first mixture, and at least one tertiary amine at a temperature in a range of 25-95° C. for a period of 6-24 hours to obtain a compound of Formula I; (c) contacting the compound of Formula I with alkyldimethylbenzylammonium chloride at a temperature in a range of 25-95° C. for a period of 6-24 hours to obtain the at least one quaternary ammonium salt.

16. The process as claimed in claim 15, wherein the at least one fatty alcohol is selected from $C_{6-20}$ alcohols.

17. The process as claimed in claim 15, wherein the at least one fatty alcohol selected from the group consisting of oleyl alcohol, stearic alcohol, linoleic alcohol, decene-1-ol, dodecene-2-ol, myristyl alcohol, cetyl alcohol, palmitic alcohol, and combinations thereof; and the at least one tertiary amine is selected from the group consisting of N, N-dimethyl benzyl amine, N, N-dimethyl octadecyl amine, N, N-dimethyl tetradecyl amine, N, N-dimethyl hexadecyl amine, and combinations thereof; and wherein the at least one solvent is selected from the group consisting of dichloromethane, chloroform, dimethylformamide, tetrahydrofuran, dimethysulfoxide, and combinations thereof.

18. The process for preparation of the corrosion inhibitor formulation as claimed in claim 14, wherein obtaining the at least one quaternary ammonium salt comprises: (a) contacting (i) at least one amine selected from aniline or N-alkyl aniline; and (ii) chloroacetyl chloride, in the presence of at least one solvent at a temperature in a range of 0-5° C. for a period of 1-6 hours to obtain a first mixture; and (b) contacting the first mixture, and at least one tertiary amine to obtain a compound of Formula II; (c) contacting the compound of Formula II with alkyldimethylbenzylammonium chloride at a temperature in a range of 25-95° C. for a period of 6-24 hours to obtain the at least one quaternary ammonium salt.

19. A process of protecting a metal surface against corrosion comprising: contacting a downhole metal surface with the corrosion inhibitor formulation as claimed in claim 1.

* * * * *